US008006092B2

(12) United States Patent
Rodriguez et al.

(10) Patent No.: US 8,006,092 B2
(45) Date of Patent: *Aug. 23, 2011

(54) DIGITAL WATERMARKS FOR CHECKING AUTHENTICITY OF PRINTED OBJECTS

(75) Inventors: Tony F. Rodriguez, Portland, OR (US); Mark E. Haynes, Manning, OR (US); Hugh L. Brunk, Portland, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/779,061

(22) Filed: Jul. 17, 2007

(65) Prior Publication Data

US 2008/0016360 A1    Jan. 17, 2008

Related U.S. Application Data

(63) Continuation of application No. 09/938,870, filed on Aug. 23, 2001, now Pat. No. 7,246,239.

(60) Provisional application No. 60/263,987, filed on Jan. 24, 2001.

(51) Int. Cl.
    *H04L 9/32* (2006.01)
(52) U.S. Cl. .......................................... 713/176; 726/32
(58) Field of Classification Search .................. 713/176; 726/32
    See application file for complete search history.

(56) References Cited

U.S. PATENT DOCUMENTS

| | | | |
|---|---|---|---|
| 4,081,132 A | 3/1978 | Pearce |
| 4,550,395 A | 10/1985 | Carlson |
| 4,552,617 A | 11/1985 | Crane |
| 5,315,098 A | 5/1994 | Tow |
| 5,617,119 A | 4/1997 | Briggs et al. |
| 5,652,626 A | 7/1997 | Kawakami et al. |
| 5,664,018 A | 9/1997 | Leighton |
| 5,734,752 A | 3/1998 | Knox |
| 5,745,604 A | 4/1998 | Rhoads |
| 5,748,763 A | 5/1998 | Rhoads |
| 5,752,152 A | 5/1998 | Gasper et al. |
| 5,761,686 A | 6/1998 | Bloomberg |
| 5,768,426 A | 6/1998 | Rhoads |
| 5,809,139 A | 9/1998 | Girod |

(Continued)

FOREIGN PATENT DOCUMENTS

EP    0493091    7/1992

(Continued)

OTHER PUBLICATIONS

Amano. "A Feature Calibration Method for Watermarking of Document Images". Proc. 5.sup.th Int'l Conf on Document Analysis and Recognition, 1999, pp. 91-94, Bangalore, India.

(Continued)

*Primary Examiner* — Christopher J Brown

(57) ABSTRACT

The invention provides methods for embedding digital watermarks for authentication of printed objects, and corresponding methods for authenticating these objects. One aspect of the invention is a method of embedding a digital watermark in a digital image to be printed on an object. The method embeds an auxiliary signal in the digital image so that the auxiliary signal is substantially imperceptible, yet machine readable. It converts the image to a halftone image using a halftoning process. If copies are made of the printed image, the image characteristics change due a change in the halftoning process used to create the copies. These changes are detected to determine whether a suspect document is authentic.

12 Claims, 3 Drawing Sheets

U.S. PATENT DOCUMENTS

| | | | |
|---|---|---|---|
| 5,825,892 A | 10/1998 | Braudaway et al. | |
| 5,841,886 A | 11/1998 | Rhoads | |
| 5,850,481 A | 12/1998 | Rhoads | |
| 5,857,038 A | 1/1999 | Owada | |
| 5,915,027 A | 6/1999 | Cox et al. | |
| 5,930,369 A * | 7/1999 | Cox et al. | 380/54 |
| 5,933,798 A | 8/1999 | Linnartz | |
| 5,951,055 A | 9/1999 | Mowry | |
| 5,974,548 A | 10/1999 | Adams | |
| 6,026,193 A | 2/2000 | Rhoads | |
| 6,104,812 A | 8/2000 | Koltai et al. | |
| 6,122,392 A | 9/2000 | Rhoads | |
| 6,122,403 A | 9/2000 | Rhoads | |
| 6,128,411 A | 10/2000 | Knox | |
| 6,246,777 B1 | 6/2001 | Agarwal et al. | |
| 6,252,675 B1 | 6/2001 | Jacobs | |
| 6,252,971 B1 | 6/2001 | Wang | |
| 6,256,110 B1 | 7/2001 | Yoshitani | |
| 6,263,086 B1 * | 7/2001 | Wang | 382/100 |
| 6,266,430 B1 | 7/2001 | Rhoads | |
| 6,275,599 B1 | 8/2001 | Adler et al. | |
| 6,285,776 B1 | 9/2001 | Rhoads | |
| 6,289,108 B1 | 9/2001 | Rhoads | |
| 6,311,214 B1 | 10/2001 | Rhoads | |
| 6,321,648 B1 | 11/2001 | Berson et al. | |
| 6,330,335 B1 | 12/2001 | Rhoads | |
| 6,332,031 B1 | 12/2001 | Rhoads et al. | |
| 6,343,138 B1 | 1/2002 | Rhoads | |
| 6,345,104 B1 | 2/2002 | Rhoads | |
| 6,351,815 B1 | 2/2002 | Adams | |
| 6,353,672 B1 | 3/2002 | Rhoads | |
| 6,359,985 B1 | 3/2002 | Koch et al. | |
| 6,363,159 B1 | 3/2002 | Rhoads | |
| 6,369,904 B1 | 4/2002 | Bhattacharjya et al. | |
| 6,384,935 B1 | 5/2002 | Yamazaki | |
| 6,389,151 B1 | 5/2002 | Carr et al. | |
| 6,400,827 B1 | 6/2002 | Rhoads | |
| 6,404,898 B1 | 6/2002 | Rhoads | |
| 6,430,302 B2 | 8/2002 | Rhoads | |
| 6,449,379 B1 | 9/2002 | Rhoads | |
| 6,496,591 B1 | 12/2002 | Rhoads | |
| 6,512,837 B1 | 1/2003 | Ahmed | |
| 6,519,352 B2 | 2/2003 | Rhoads | |
| 6,522,771 B2 | 2/2003 | Rhoads | |
| 6,533,385 B1 | 3/2003 | Mackay et al. | |
| 6,535,618 B1 | 3/2003 | Rhoads | |
| 6,539,095 B1 | 3/2003 | Rhoads | |
| 6,542,618 B1 | 4/2003 | Rhoads | |
| 6,542,620 B1 | 4/2003 | Rhoads | |
| 6,560,349 B1 | 5/2003 | Rhoads | |
| 6,567,534 B1 | 5/2003 | Rhoads | |
| 6,567,535 B2 | 5/2003 | Rhoads | |
| 6,567,780 B2 | 5/2003 | Rhoads | |
| 6,574,350 B1 | 6/2003 | Rhoads et al. | |
| 6,580,819 B1 | 6/2003 | Rhoads | |
| 6,587,821 B1 | 7/2003 | Rhoads | |
| 6,590,997 B2 | 7/2003 | Rhoads | |
| 6,591,365 B1 | 7/2003 | Cookson | |
| 6,608,919 B1 | 8/2003 | Alattar | |
| 6,614,914 B1 | 9/2003 | Rhoads et al. | |
| 7,016,516 B2 | 9/2003 | Rhoads | |
| 6,636,615 B1 | 10/2003 | Rhoads et al. | |
| 6,647,129 B2 | 11/2003 | Rhoads | |
| 6,654,480 B2 | 11/2003 | Rhoads | |
| 6,654,887 B2 | 11/2003 | Rhoads | |
| 6,675,146 B2 | 1/2004 | Rhoads | |
| 6,694,041 B1 | 2/2004 | Brunk | |
| 6,724,912 B1 | 4/2004 | Carr et al. | |
| 6,728,390 B2 | 4/2004 | Rhoads et al. | |
| 6,738,495 B2 | 5/2004 | Rhoads et al. | |
| 6,744,906 B2 | 6/2004 | Rhoads et al. | |
| 6,744,907 B2 | 6/2004 | Rhoads | |
| 6,748,533 B1 | 6/2004 | Wu et al. | |
| 6,750,985 B2 | 6/2004 | Rhoads et al. | |
| 6,754,377 B2 | 6/2004 | Rhoads | |
| 6,757,406 B2 | 6/2004 | Rhoads | |
| 6,760,464 B2 | 7/2004 | Brunk | |
| 6,768,808 B2 | 7/2004 | Rhoads | |
| 6,771,796 B2 | 8/2004 | Rhoads | |
| 6,771,797 B2 | 8/2004 | Ahmed | |
| 6,778,682 B2 | 8/2004 | Rhoads | |
| 6,778,800 B2 | 8/2004 | Shim et al. | |
| 6,785,815 B1 | 8/2004 | Serret-Avile et al. | |
| 6,804,376 B2 | 10/2004 | Rhoads et al. | |
| 6,804,377 B2 | 10/2004 | Reed | |
| 6,804,379 B2 | 10/2004 | Rhoads | |
| 6,834,344 B1 | 12/2004 | Aggarwal et al. | |
| 6,850,626 B2 | 1/2005 | Rhoads et al. | |
| 6,882,738 B2 | 4/2005 | Davis et al. | |
| 6,944,298 B1 | 9/2005 | Rhoads | |
| 6,959,100 B2 | 10/2005 | Rhoads | |
| 6,959,386 B2 | 10/2005 | Rhoads | |
| 6,961,444 B2 | 11/2005 | Levy | |
| 6,970,573 B2 | 11/2005 | Carr et al. | |
| 6,978,036 B2 | 12/2005 | Alattar et al. | |
| 6,983,051 B1 | 1/2006 | Rhoads | |
| 6,987,862 B2 | 1/2006 | Rhoads | |
| 6,993,152 B2 | 1/2006 | Patterson et al. | |
| 6,993,154 B2 | 1/2006 | Brunk | |
| 7,003,132 B2 | 2/2006 | Rhoads | |
| 7,020,303 B2 | 3/2006 | Levy | |
| 7,020,349 B2 | 3/2006 | Brunk | |
| 7,027,612 B2 | 4/2006 | Patterson | |
| 7,054,461 B2 | 5/2006 | Zeller et al. | |
| 7,054,462 B2 | 5/2006 | Rhoads et al. | |
| 7,054,463 B2 | 5/2006 | Rhoads et al. | |
| 7,076,084 B2 | 7/2006 | Davis et al. | |
| 7,113,596 B2 | 9/2006 | Rhoads | |
| 7,113,615 B2 | 9/2006 | Rhoads et al. | |
| 7,116,781 B2 | 10/2006 | Rhoads | |
| 7,130,087 B2 | 10/2006 | Rhoads | |
| 7,142,691 B2 | 11/2006 | Levy | |
| 7,171,020 B2 | 1/2007 | Rhoads et al. | |
| 7,181,022 B2 | 2/2007 | Rhoads | |
| 7,184,570 B2 | 2/2007 | Rhoads | |
| 7,197,164 B2 | 3/2007 | Levy | |
| 7,239,734 B2 | 7/2007 | Alattar et al. | |
| 7,242,790 B2 | 7/2007 | Rhoads | |
| 7,246,239 B2 | 7/2007 | Rodriguez et al. | |
| 7,248,715 B2 | 7/2007 | Levy | |
| 7,263,203 B2 | 8/2007 | Rhoads et al. | |
| 7,266,217 B2 | 9/2007 | Rhoads et al. | |
| 7,269,275 B2 | 9/2007 | Carr et al. | |
| 7,277,468 B2 | 10/2007 | Tian et al. | |
| 7,286,684 B2 | 10/2007 | Rhoads et al. | |
| 7,305,117 B2 | 12/2007 | Davis et al. | |
| 7,313,253 B2 | 12/2007 | Davis et al. | |
| 7,321,667 B2 | 1/2008 | Stach | |
| 7,340,076 B2 | 3/2008 | Stach et al. | |
| 7,346,776 B2 | 3/2008 | Levy et al. | |
| 7,349,555 B2 | 3/2008 | Rhoads | |
| 7,359,528 B2 | 4/2008 | Rhoads | |
| 7,372,976 B2 | 5/2008 | Rhoads et al. | |
| 7,400,743 B2 | 7/2008 | Rhoads et al. | |
| 7,415,129 B2 | 8/2008 | Rhoads | |
| 7,418,111 B2 | 8/2008 | Rhoads | |
| 7,424,131 B2 | 9/2008 | Alattar et al. | |
| 7,424,132 B2 | 9/2008 | Rhoads | |
| 7,499,564 B2 | 3/2009 | Rhoads | |
| 7,519,819 B2 | 4/2009 | Bradley et al. | |
| 7,532,741 B2 | 5/2009 | Stach | |
| 7,536,555 B2 | 5/2009 | Rhoads | |
| 7,539,325 B2 | 5/2009 | Rhoads et al. | |
| 7,548,643 B2 | 6/2009 | Davis et al. | |
| 7,555,139 B2 | 6/2009 | Rhoads et al. | |
| 7,567,686 B2 | 7/2009 | Rhoads | |
| 7,570,784 B2 | 8/2009 | Alattar | |
| 7,602,940 B2 | 10/2009 | Rhoads et al. | |
| 7,602,977 B2 | 10/2009 | Rhoads et al. | |
| 7,606,390 B2 | 10/2009 | Rhoads | |
| 7,607,016 B2 | 10/2009 | Brunk et al. | |
| 7,620,200 B2 | 11/2009 | Rhoads | |
| 7,639,837 B2 | 12/2009 | Carr et al. | |
| 7,643,649 B2 | 1/2010 | Davis | |

| | | | |
|---|---|---|---|
| 7,656,930 B2 | 2/2010 | Tian et al. |
| 7,672,477 B2 | 3/2010 | Rhoads |
| 7,676,059 B2 | 3/2010 | Rhoads |
| 7,693,965 B2 | 4/2010 | Rhoads |
| 7,697,719 B2 | 4/2010 | Rhoads |
| 7,702,511 B2 | 4/2010 | Rhoads |
| 7,711,143 B2 | 5/2010 | Rhoads |
| 7,720,249 B2 | 5/2010 | Rhoads |
| 7,720,255 B2 | 5/2010 | Rhoads |
| 7,724,919 B2 | 5/2010 | Rhoads |
| 7,763,179 B2 | 7/2010 | Levy |
| 7,796,826 B2 | 9/2010 | Rhoads et al. |
| 7,822,225 B2 | 10/2010 | Alattar |
| 7,831,062 B2 | 11/2010 | Stach |
| 2001/0022848 A1 | 9/2001 | Rhoads |
| 2001/0024510 A1 | 9/2001 | Iwamura |
| 2001/0030769 A1 | 10/2001 | Jacobs |
| 2001/0053299 A1 | 12/2001 | Matsunoshita et al. |
| 2002/0002679 A1 | 1/2002 | Murakami et al. |
| 2002/0009208 A1 | 1/2002 | Alattar et al. |
| 2002/0012445 A1 | 1/2002 | Perry |
| 2002/0012447 A1 | 1/2002 | Amidror et al. |
| 2002/0080396 A1 | 6/2002 | Silverbrook |
| 2002/0080995 A1 | 6/2002 | Rhoads |
| 2002/0105679 A1 | 8/2002 | Haynes |
| 2002/0126871 A1 | 9/2002 | Hannigan et al. |
| 2002/0136429 A1 | 9/2002 | Stach et al. |
| 2002/0150246 A1 | 10/2002 | Ogino |
| 2002/0168087 A1 | 11/2002 | Petrovic |
| 2002/0169962 A1 | 11/2002 | Brundage |
| 2002/0176114 A1 | 11/2002 | Zeller et al. |
| 2003/0021440 A1 | 1/2003 | Rhoads |
| 2003/0138128 A1 | 7/2003 | Rhoads |
| 2004/0057581 A1 | 3/2004 | Rhoads |
| 2004/0181671 A1 | 9/2004 | Brundage et al. |
| 2004/0263911 A1 | 12/2004 | Rodriguez |
| 2006/0028689 A1 | 2/2006 | Perry et al. |
| 2006/0062386 A1 | 3/2006 | Rhoads |
| 2007/0016790 A1 | 1/2007 | Brundage et al. |
| 2007/0172098 A1 | 7/2007 | Rhoads |
| 2007/0180251 A1 | 8/2007 | Carr |
| 2007/0201835 A1 | 8/2007 | Rhoads |
| 2008/0131083 A1 | 6/2008 | Rhoads |
| 2008/0131084 A1 | 6/2008 | Rhoads |
| 2008/0149713 A1 | 6/2008 | Brundage |
| 2008/0253740 A1 | 10/2008 | Rhoads |
| 2008/0270801 A1 | 10/2008 | Levy et al. |
| 2008/0275906 A1 | 11/2008 | Rhoads et al. |
| 2009/0252401 A1 | 10/2009 | Davis et al. |
| 2010/0008534 A1 | 1/2010 | Rhoads |
| 2010/0008536 A1 | 1/2010 | Rhoads |
| 2010/0008537 A1 | 1/2010 | Rhoads |
| 2010/0021004 A1 | 1/2010 | Rhoads |
| 2010/0027969 A1 | 2/2010 | Alattar |
| 2010/0040255 A1 | 2/2010 | Rhoads |
| 2010/0042843 A1 | 2/2010 | Brunk et al. |
| 2010/0119108 A1 | 5/2010 | Rhoads |
| 2010/0131767 A1 | 5/2010 | Rhoads |
| 2010/0142752 A1 | 6/2010 | Rhoads et al. |
| 2010/0146285 A1 | 6/2010 | Rhoads et al. |
| 2010/0163629 A1 | 7/2010 | Rhoads et al. |
| 2010/0172538 A1 | 7/2010 | Rhoads |

FOREIGN PATENT DOCUMENTS

| | | |
|---|---|---|
| EP | 0629972 | 12/1994 |
| EP | 1152592 | 11/2001 |
| EP | 1209897 | 5/2002 |
| GB | 2346110 | 8/2000 |
| GB | 2346111 | 8/2000 |
| WO | WO00/62258 | 10/2000 |
| WO | WO/0174053 | 10/2001 |
| WO | WO02/25599 | 3/2002 |
| WO | WO02/056264 | 7/2002 |
| WO | WO02/098670 | 12/2002 |

OTHER PUBLICATIONS

Baharav. "Watermarking of Dither Halftoned Images", SPIE vol. 3657, Jan. 1999, pp. 307-316.

Bender et al., "Applications for Data Hiding," IBM Systems Journal, vol. 39, Nos. 3&4, 2000, pp. 547-568.

Bender et al., "Techniques for Data Hiding," SPIE vol. 2420, Jan. 1995, pp. 164-173.

Berghel et al., "Protecting Ownership Rights Through Digital Watermaking," Computer, pp. 101-103, Jul. 1996.

Bloomberg, "Embedding Digital Data on Paper in Iconic Text," Feb. 12-13, 1997, Proc. SPIE—Int. Soc. Opt. Eng., vol. 3027, pp. 67-80.

Brassil et al., Electronic Marking and Identification Techniques to Discourage Document Copying, Proceedings of INFOCOM '94 Conference on Computer, IEEE Commun. Soc Conference, Jun. 12-16, 1994, pp. 1278-1287.

Brassil et al., "Hiding Information in Document Images," Nov. 1995, 7 pages.

Caronni, "Assuring Ownership Rights for Digital Images," Published in the Proceedings of Reliable IT Systems, VIS '98, HH. Bruggemann and W. Gerhardt-Hackl (Ed.), Vieweg Publishing Company, Germany, 1995, Jun. 14, 1994, 10 pages.

Cox et al., "A Secure, Imperceptable Yet Perceptually Salient, Spread Spectrum Watermark for Multimedia," IEEE, Southcon/96, Conference Record pp. 192-197, 1996.

Dautzenberg, "Watermarking Images," Department of Microelectronics and Electrical Engineering, Trinity College Dublin, 47 pages, Oct. 1994.

Frequently Asked Questions About Digimare Signature Technology, Aug. 1, 1995, HTTP://WWW.DIGIMARC.COM, 9 pages.

Hecht, "Embedded Data Glyph Technology for Hardcopy Digital Documents," SPIE vol. 2171, Feb. 1994, pp. 341-352.

Hsu et al., "DCT-Based Watermarking for Video," IEEE Transactions on Consumer Electronics, vol. 44, No. 1, Feb. 1998, pp. 206-216.

Knox, "Digital Watermarks Using Stochastic Screens", SPIE vol. 3018, 1997, pp. 3 316-322.

Koch et al., "Copyright Protection for Multimedia Data," Proc. of the International Conference on Digital Media and Electronic Publishing, Dec. 1994, Leeds, U.K., 15 pages.

Komatsu et al., "A Proposal on Digital Watermark in Document Image Communication and Its Application to Realizing a Signature," Electronics and Communications in Japan, Part 1, vol. 73. No. 5, 1990, pp. 22-33.

Komatsu et al., "Authentication System Using Concealed Image in Telematics," Memoirs of the School of Science & Engineering, Waseda Univ., No. 52, 1988, pp. 45-60.

Linnartz et al., Philips Electronics' Response to Call for Proposals Issued by the Data Hiding SubGroup, Copy Protection Technical Working Group, Sep. 1997, 32 pages.

Low, "Document Identification for Copyright Protection Using Centroid Detection", IEEE, vol. 46, No. 3, Mar. 1998, pp. 372-383.

Matsui et al., "Embedding A Watermark to Binary Pictures in a Hardcopy System," Memoirs of the National Defense Academy (Japan) vol. 36, No. 2, pp. 13-20.

Matsui et al., "Video-Steganography: How to Secretly Embed a Signature in a Picture," IMA Intellectual Property Project Proceedings, Jan. 1994, vol. 1, Issue 1, pp. 187-205.

Mei, "Data Hiding in Binary Text Documents", SPIE vol. 4314, 2001, pp. 369-375.

Nakamura et al., "A Unified Coding Method of Dithered Image and Text Data Using Micropatterns," Electronics and Communications in Japan, Part 1, vol. 72, No. 4, 1989, pp. 50-56.

Nakamura et al., "A Unified Coding Method of Image and Text Data Using Discrete Orthogonal Transform," Systems and Computers in Japan, vol. 21, No. 3, 1990, pp. 87-92.

Szepanski, "A Signal Theoretic Method for Creating Forgery-Proof Documents for Automatic Verification," Proceedings 1979 Carnban Conference on Crime Countermeasures, May 16, 1979, pp. 101-109.

Tanaka et al., "Embedding Secret Information Into a Dithered Multi-Level Image," Proc. IEEE Military Comm. Conf., Sep. 1990, pp. 216-220.

Tanaka, et al., "Embedding the Attribute Information Into a Dithered Image," Systems and Computers in Japan, vol. 21, No. 7, 1990, pp. 43-50.

Tanaka et al., "New Integrated Coding Schemes for Computer Aided Facsimile," Proc. IEEE Int'Conf. on Sys. Integration, Apr. 1990, pp. 275-281.

Wang, "Embedding Digital Watermarks in Halftone Screen", SPIE vol. 3971, 2001, pp. 218-227.

Wu, "Data Hiding in Digital Binary Image", IEEE, 2000, pp. 393-396.

Zhao, "A WWW Service to Embed and Prove Digital Copyright Watermarks", Proc. Of the European Conf. on Multimedia Applications, May 1996.

Schneider, M., "A Robust Content Based Digital Signature for Image Authentication," IEEE Proc. Int. Conf. on Image Processing, Sep. 1996, pp. 227-230 (vol. 3).

U.S. Appl. No. 08/154,866, dated Nov. 18, 1993, Geoffrey B. Rhoads.
U.S. Appl. No. 08/215,289, dated Mar. 17, 1994, Geoffrey B. Rhoads.
U.S. Appl. No. 09/150,147, dated Sep. 9, 1998, Geoffrey B. Rhoads.
U.S. Appl. No. 09/151,492, dated Sep. 11, 1998, Bruce L. Davis et al.
U.S. Appl. No. 09/496,380, dated Feb. 2, 2000, Geoffrey B. Rhoads.
U.S. Appl. No. 12/881,911, dated Sep. 14, 2010, Geoffrey B. Rhoads et al.
U.S. Appl. No. 12/692,470, dated Jan. 22, 2010, Jun Tian et al.

* cited by examiner

Fig. 2

Screening Structure A

| X | X |   |   |   |
|---|---|---|---|---|
| X | X |   |   |   |
|   |   |   |   |   |
|   |   |   | X | X |
|   |   |   | X | X |

Screening Structure B

|   | X |   |   |   |
|---|---|---|---|---|
| X |   | X |   |   |
|   | X |   | X |   |
|   |   | X |   | X |
|   |   |   | X |   |

Screening Structure C

|   |   |   |   |   |
|---|---|---|---|---|
|   | X | X | X |   |
|   | X |   | X |   |
|   | X | X | X |   |
|   |   |   |   |   |

Screening Structure D

| X | X |   |   |   |
|---|---|---|---|---|
| X | X |   |   |   |
|   |   | X | X |   |
|   |   | X | X |   |
|   |   |   |   |   |

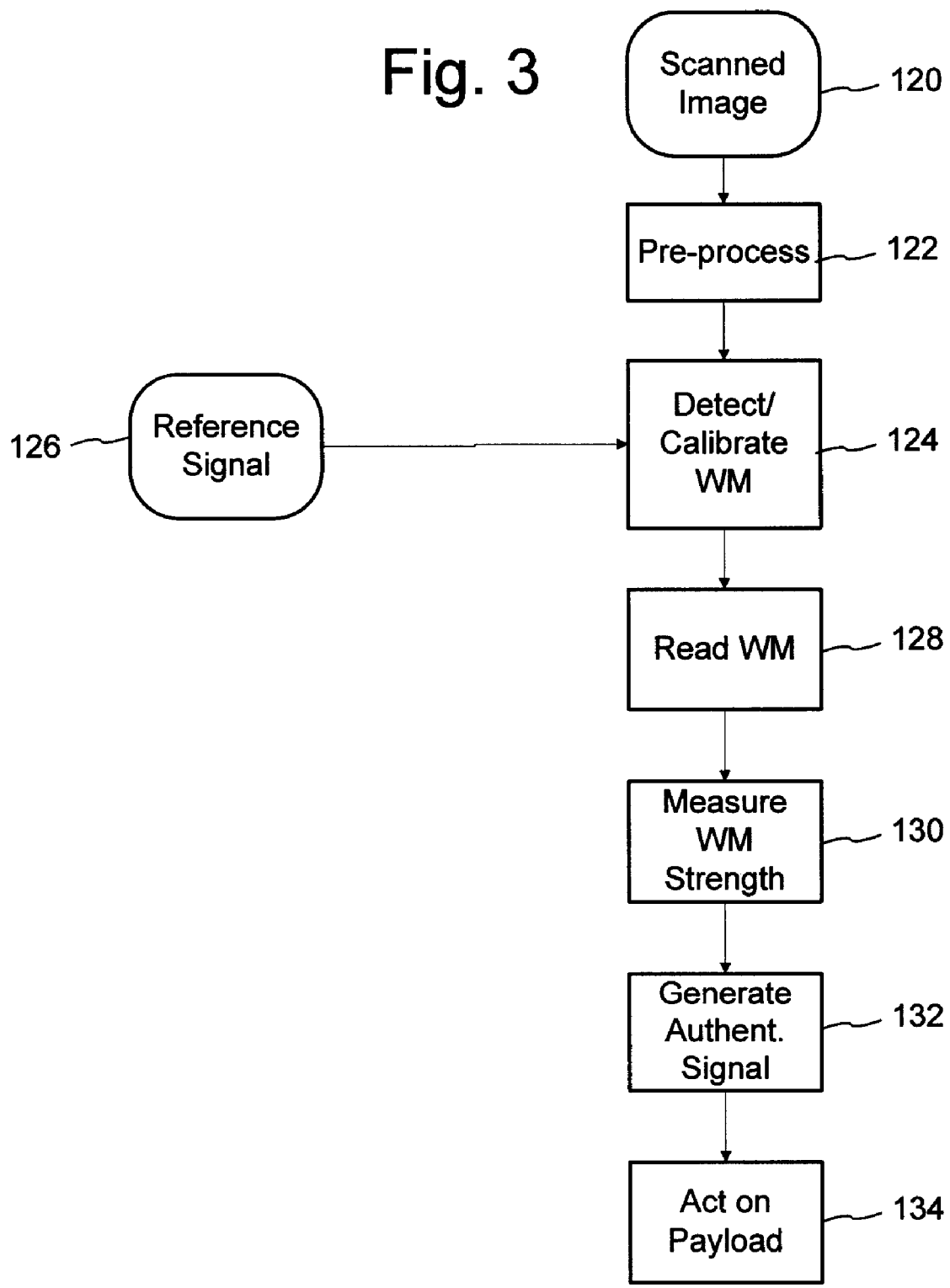

DIGITAL WATERMARKS FOR CHECKING AUTHENTICITY OF PRINTED OBJECTS

RELATED APPLICATION DATA

This application is a continuation of U.S. patent application Ser. No. 09/938,870, filed Aug. 23, 2001 (now U.S. Pat. No. 7,246,239).

The subject matter of the present application is related to that disclosed in U.S. patent application Ser. No. 09/840,016, filed Apr. 20, 2001 (Now U.S. Pat. No. 6,760,464), 60/263,987, filed Jan. 24, 2001, Ser. No. 09/689,226, filed Oct. 11, 2000, and Ser. No. 09/234,780, filed Jan. 20, 1999, which are hereby incorporated by reference.

TECHNICAL FIELD

The invention relates to steganography and data hiding, and specifically relates to the use of digital watermarks for authentication of printed objects.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including text documents (e.g., through line, word or character shifting), software, multi-dimensional graphics models, and surface textures of objects.

Digital watermarking systems typically have two primary components: an encoder that embeds the watermark in a host media signal, and a decoder that detects and automatically reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's application Ser. No. 09/503,881 (Now U.S. Pat. No. 6,614,914) and U.S. Pat. No. 6,122,403, which are hereby incorporated by reference.

This document describes methods for embedding digital watermarks for authentication of printed objects, and corresponding methods for authenticating these objects. One such method embeds an auxiliary signal in the digital image so that the auxiliary signal is substantially imperceptible, yet machine readable. It converts the image to a halftone image using an inherently unstable halftone screen structure that is likely to cause ink flow errors when reproduced. The errors introduced by reproducing the unstable halftone screen structure incorrectly are automatically detectable by reading the auxiliary signal.

An authentication method receives a digital image scanned of the printed object, and detects a digital watermark in the digital image. It then uses a measurement of strength of the digital watermark to detect reproduction errors due to inaccurate reproduction of unstable halftone screen structures in the printed object. Another method of authenticating a printed object uses different watermarks in the object. This method detects a first digital watermark from a substrate of the printed object, and detects a second digital watermark from an image scanned from the printed object. It uses the relationship between the first and second digital watermarks to determine authenticity of the printed object.

Another method detects a visible fiducial in an image scanned from the printed object, and detects a location of a digital watermark hidden in the printed object. It determines authenticity of the printed object by comparing the location of the digital watermark to the visible fiducial.

One aspect of the invention is a method of embedding a digital watermark in a digital image to be printed on an object. This method generates an image to be printed based on the digital image, including converting the digital image to a halftone image, and embedding an auxiliary signal in the digital image so that the auxiliary signal is substantially imperceptible, yet machine readable. The method encodes a message in the auxiliary signal that includes halftone information, which is automatically readable from a printed version of the image to enable checking whether measured attributes of the printed version of the image correspond to the halftone information.

Another aspect of the invention is a method of authenticating a printed object comprising. This method receives a digital image scanned of the printed object, detects a digital watermark in the digital image, extracts halftone information from the digital watermark, and evaluates the digital image for attributes that correspond to the halftone information from the digital watermark to determine authenticity of the printed object.

Further features will become apparent with reference to the following detailed description and accompanying drawings.

BRIEF DESCRIPTION OF THE DRAWINGS

FIG. 2 illustrates an example showing different halftone structures, including a relatively stable structure (A), and inherently unstable structures (B and C).

FIG. 3 is a diagram illustrating a process for detecting an authentication watermark from a scanned image of the watermarked object, and for assessing the validity of the watermark signal.

DETAILED DESCRIPTION

Figure 1:
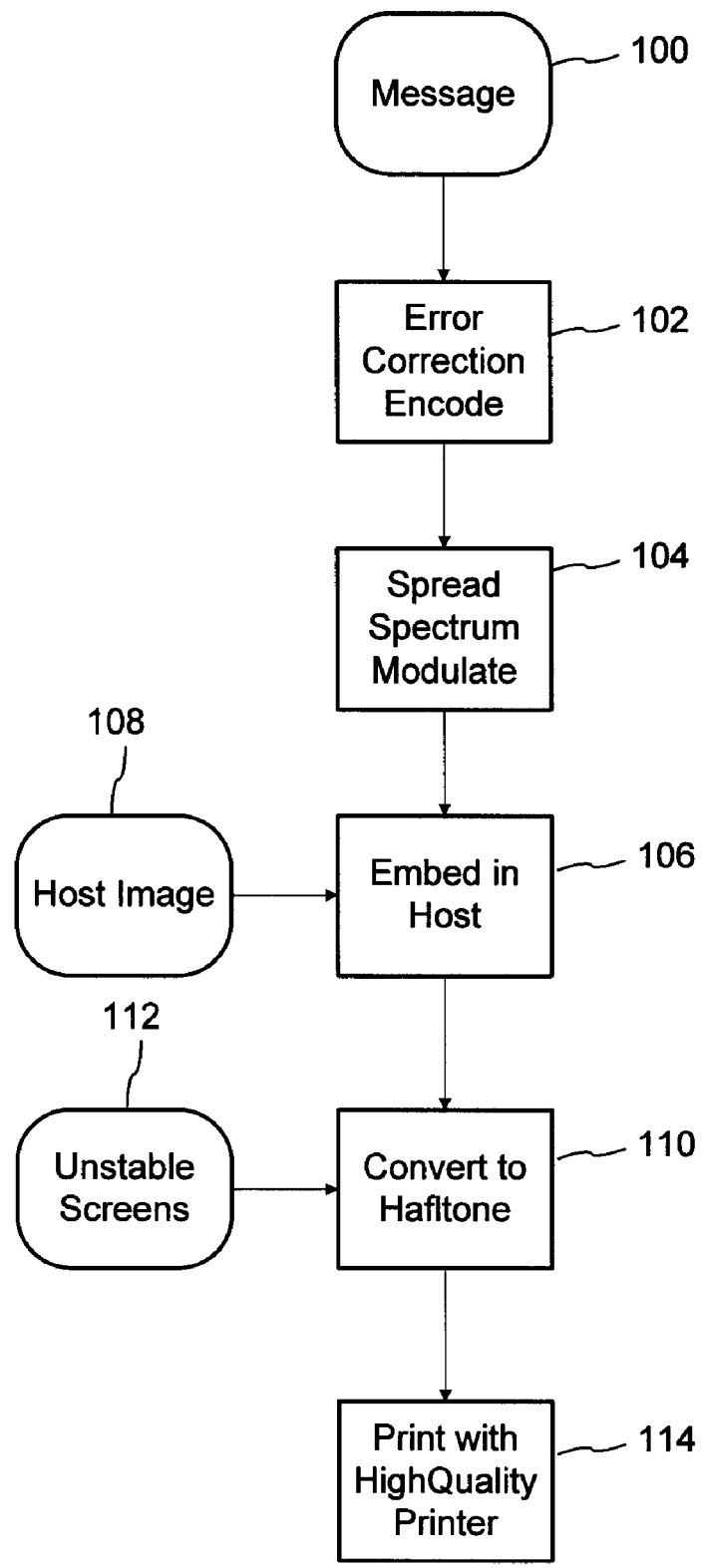
FIG. 1 illustrates a flow diagram of watermark embedding and halftone screening process using inherently unstable screens to create an authentication watermark on a printed object.

Using Inherently Unstable Structure as Screening Elements

FIG. 1 illustrates a flow diagram of watermark embedding and halftone screening process using inherently unstable screens to create an authentication watermark on a printed object. This process generates a digital watermark signal and embeds it in a halftone image. The screens used to create the halftone image have inherently unstable dot structures that are difficult to reproduce. As such, if the printed object is copied (e.g., scanned and re-printed) the dot structures are likely to change. A watermark reader processes a digital image of the object, and detects errors in the watermark signal due to the changes in the ink structures. The extent of these errors indicate the extent to which the printed object is likely to be a counterfeit.

Turning to FIG. 1, this example digital watermark embedding process starts with a message (100) to be hidden in the printed document. The message comprises a set of binary (or M-ary) symbols, including both fixed symbols to assist in detection and message interpretation (e.g., a message common to a particular message protocol), and variable symbols to carry a variable message (e.g., a unique message for a particular printed item). The message is error correction encoded (e.g., convolution, turbo, BCH, repetition coding) (102), and then spread spectrum modulated with a carrier signal (104). In this example, the carrier signal comprises a pseudorandom image signal that corresponds to a block of image samples in the host image. The spread spectrum modulation function may be implemented using a variety of spreading functions, such as convolving, multiplication, XOR, XNOR operations between the message signal and the carrier to create a watermark signal. Preferably, the watermark signal has a calibration signal component, e.g., signal patterns such as peaks in the autocorrelation or Fourier domain that facilitate detection, and calculation of rotation, scale and translation parameters of the watermark signal in an image scan of a printed object carrying the watermark. Examples of spread spectrum modulation and calibration signals are disclosed in co-pending application Ser. No. 09/503,881 and U.S. Pat. No. 6,122,403, incorporated above.

In this implementation, a digital watermark signal is generated at a source resolution that is lower than the target resolution of the half tone dots used to create the printed image. The watermark signal is embedded using an embedding process (106) that adds samples of the watermark signal to corresponding samples of the host image (108). The embedding function may also include perceptual masking of the watermark signal, such as adjusting the watermark signal strength according to Human Visibility System modeling filters that determine the capacity of the host image to hide the watermark signal. The embedding process (106) creates a watermarked image signal comprising an array of multi-level per pixel values at specified resolution.

Next, the watermarked image signal is converted to an image comprised of halftone dots at a target resolution that is higher than the source resolution of the watermarked signal (110). The half tone dot represents the presence or absence of ink at a particular spatial location on a printed object. The halftone process uses inherently unstable screens (112) to convert selected multi-level per pixel samples in the watermarked image to corresponding halftone dot structures comprising an array of halftone dots.

In some applications, like corporate logos, graphic symbols, etc. the host image can be particularly adapted to carry a watermark signal. In other words, the watermark signal and corresponding image are designed together to form the watermarked image. In this case, there is no need for a generic watermark embedding technique that is broadly applicable to a variety of images. Also, this enables the image to be designed with special features that assist in watermark detection, like visible fiducials that enable the watermark reader to align the image geometrically before detecting the watermark or performing other image analysis. Conventional pattern recognition and registration routines may be used to align the image as a pre-process step before authentication.

FIG. 2 illustrates an example showing different halftone structures, including a relatively stable structure (A), and inherently unstable structures (B and C). To create an authentic printed object, these unstable structures are used to create a halftone image, which is then printed with a high quality printer (110) capable of accurately retaining the unstable structure of ink on the printed object. Later, if the printed object is scanned and printed, it is difficult to reproduce the structures on typical ink jet printers, even if the authentic object is scanned with a high resolution scanner. For such ink jet printers, an inherently unstable structure creates the likelihood of ink flow such that ink jet printer is unlikely to reproduce the structure with the same ink coverage (e.g. the ink density over the same area changes causing a change in color or luminance of the pixel). The ink flow at the boundary of the unstable structure causes more area to be covered, and as such, an ink jet printer with such ink flow cannot accurately reproduce the unstable structure without changing the density of ink over the area covered by the structure in the authentic printed object.

As an example, consider the case where the watermarked signal has a resolution of 100 dpi and the halftone dot resolution is 500 dpi. In other words, each 100 dpi pixel in the watermarked signal corresponds to a 5 by 5 array of halftone dots. To represent a multilevel per pixel value of 8/25, any of the structures A-C could be used, but structures B and C are more likely to cause ink flow problems if a counterfeiter tries to reproduce them using an ink jet printer with ink flow problems. For example, the same 5 by 5 area may be reproduced as 10/25 (10 halftone dots with ink) instead of 8/25 (8 halftone dots with ink).

Traditional halftone screening algorithms avoid square clusters of halftone dots in cases where about 50% of the dots are turned on. The reason for avoiding this pattern of halftone dot clusters is that it causes ink to flow between the dots where the corners of the square clusters meet. Structure D in FIG. 2 illustrates an example of an unstable screen with square clusters joined at the corners. While avoided in the traditional case, this arrangement may be used advantageously to authenticate a printed object because certain printing presses can represent the pattern accurately on paper. However, when reproduced by the counterfeiter on a different printer, error due to ink flow are likely.

The error in reproduction can cause the watermark to be un-detectable by an automated reader, or may create enough errors in the watermark signal to indicate that the printed object is likely a fake. In the first case, if the watermark reader cannot detect the watermark, the printed object is deemed not to be authentic. In the second case, the authenticity is determined by evaluating the watermark strength relative to a threshold. This process embeds a watermark at a sufficiently low resolution and sufficiently high strength to enable the watermark to be read using commercial scanners and web cameras, and it also enables detection of invalid printed objects.

FIG. 3 is a diagram illustrating a process for detecting an authentication watermark from a scanned image of the digitally watermarked object, and for assessing the validity of the watermark signal. First, the user holds the printed object up to a web camera or places it on an image scanner plate. The watermark reader receives a digital image (120) of the printed object, and pre-processes it to prepare for watermark detection (122).

The pre-processing (122) entails a conversion to the color plane in which the watermark signal is embedded (e.g., blue channel, yellow channel, luminance, chrominance, etc.), and a filtering of blocks of the image to identify candidate blocks that are likely to have the authentication watermark. Examples of the filtering include looking for portions of the image with a certain signal activity (texture), color, edge concentration, etc.

Next, the watermark detector proceeds to detect the watermark signal and determine orientation parameters of watermark signal blocks (e.g., rotation, scale, translation). The candidate image blocks identified in the pre-processing stage are transformed into a transform domain for detection of the calibration component. For example, candidate blocks are transformed into an autocorrelation domain or Fourier domain, where peaks of the calibration component are detected and correlated with a reference signal having attributes of the known calibration signal component. An example of this technique using the Fourier-Mellin transform to recover rotation and scale is described in application Ser. No. 09/503,881 (Now U.S. Pat. No. 6,614,914) and U.S. Pat. No. 6,122,403, incorporated above. This example detector correlates the pseudorandom phase information of the calibration signal with phase information of the received image, after compensating for rotation and scale to get the coordinates of the origin of a watermark block.

Next, the watermark detector reads the message embedded in the watermark signal (128). In this implementation, the detector is calibrated to read the watermark at its original resolution at the time of embedding (e.g., 100 dpi in the example above). To reduce the interference of the original host signal, the detector predicts the original signal and subtracts it, leaving an estimate of the watermark signal. The detector then performs the inverse of the spread spectrum modulation to compute raw estimates of the error correction encoded message symbols. These are soft estimates weighted by a probability reflecting the statistical confidence in the accuracy of the symbol. The soft estimates are supplied to an error correction decoder compatible with the one in the encoder, which generates a message, including the fixed and variable message symbols.

Error detection symbols, such as CRC bits computed on the message, indicate whether the decoded message is valid. If the detector is unable to extract a valid watermark, the printed object is deemed to be a copy. A successful watermark detection is measured by the degree of correlation between the detected signal and the reference signal in the calibration phase, and/or a valid message as determined by the error detection evaluation.

If a valid watermark message is recovered, the detector proceeds to measure the strength of the watermark signal. There are multiple metrics for assessing watermark strength, including the degree of correlation between the reference signal and the detected signal, and a measure of symbol errors in the raw message estimates. One way to measure the symbol errors is to reconstruct the raw message sequence using the same error correction coding process of the embedder on the valid message extracted from the watermark. This process yields, for example, a string of 1000 binary symbols, which can be compared with the binary symbols estimated at the output of the spread spectrum demodulator. The stronger the agreement between the reconstructed and detected message, the stronger the watermark signal.

More specifically, an approach for measuring the strength of the watermark signal is as follows:

1. Use the message payload read from the watermark to re-create the original embedded bit sequence (including redundantly encoded bits from error correction coding) used for the watermark.
2. Convert the original bit sequence so that a zero is represented by −1 and a one is represented by 1.
3. Multiply (element-wise) the soft-valued bit sequence used to decode the watermark by the sequence of step 2.
4. Create one or more measures of watermark strength from the sequence resulting in the previous step. One such measure is the sum of the squares of the values in the sequence. Another measure is the square of the sum of the values in the sequence. Other measurements are possible as well. For example, soft bits associated with high frequency components of the watermark signal may be analyzed to get a strength measure attributed to high frequency components. Such high frequencies are likely to be more sensitive to degradation due to photocopying, digital to analog and analog to digital conversion, scanning and re-printing, etc.
5. Compare the strength measures to thresholds to decide if the suspect image has been captured from an original or a copy of the printed object. The threshold is derived by evaluating the difference in measured watermark strength of copied vs. original printed objects on the subject printer platform used to create the original, and a variety of copiers, scanners and printers used to create copies.

This same technique of measuring symbol errors can be applied to two or more different watermarks embedded at different spatial resolutions. Each of the watermarks may have the same or different message payloads. In the first case where the watermarks have the same message payloads, the message extracted from one of the watermarks may be used to measure bit errors in each of the other watermarks. For example, the message payload from a robust watermark embedded at a low spatial resolution may be used to measure the bit errors from a less robust watermark at a higher spatial resolution. If the watermarks carry different message payloads, then error detection bits, such as CRC bits, can be used in each message payload to ensure that the message is accurately decoded before re-creating the original, embedded bit sequence.

Using two or more different watermarks enables a threshold to be set based on the ratio of the signal strength of the watermarks relative to each other. In particular, the signal strength of a first watermark at a high resolution (600-1200 dpi) is divided by the signal strength of a second watermark at a lower resolution (75-100 dpi). In each case, the signal strength is measured using a measure of symbol errors or some other measure (e.g., correlation measure).

If the measured strength exceeds a threshold, the detector deems the watermark signal to be authentic and generates an authentication signal (132). This signal may be a simple binary value indicating whether or not the object is authentic, or a more complex image signal indicating where bit errors were detected in the scanned image.

The watermark and host signal can be particularly tailored to detect copying by photo duplication and printing/re-scanning of the printed object. This entails embedding the watermark with selected screening structures at particular spatial frequencies/resolutions that are likely to generate message symbol errors when the object is re-printed. This detection process has an additional advantages in that it enables automatic authentication, it can be used with lower quality camera devices such as web cams and common image scanners, and it allows the watermark to serve the functions of determining authenticity as well as carrying a message payload useful for a variety of applications.

The message payload can include an identifier or index to a database that stores information about the object or a link to a network resource (e.g., a web page on the Internet). The payload may also include a covert trace identifier associated with a particular authentic item, batch of items, printer, or distributor. This enables a counterfeit object, or authentic object that has been printed without authority to be detected and traced to a particular source, such as its printer, distributor or batch number.

The payload may also carry printer characteristics or printer type information that enables the watermark reader to adapt its detection routines to printer types that generated the authentic object. For example, the payload may carry an identifier that specifies the type of halftoning used to create the authentic image, and more specifically, the attributes of the halftone screen. With this information, the reader can check authenticity by determining whether features associated with the halftone screen exist in the printed object. Similarly, the reader can check for halftone screen attributes that indicate that a different halftone screen process has been used (e.g., a counterfeit has been created using a different halftone screen). One specific example is a payload that identifies the halftone screen type and paper type. The reader extracts this payload from a robust watermark payload and then analyzes the halftone screen and paper attributes to see if they match the halftone type and paper type indicated in the watermark payload. For example, the halftone type can specify the type of unstable screen used to create an authentic image. If this unstable screen is not detected (e.g., by absence of a watermark embedded in the unstable screen), then the image is considered to be a fake.

A related approach for analyzing halftone type is to look for halftone attributes, like tell-tale signs of stochastic halftone screens vs. ordered dither matrix type screens. Dither matrix screens used in low end printers tend to generate tell tale patterns, such as a pattern of peaks in the Fourier domain that differentiate the halftone process from a stochastic screen, such as an error diffusion process, which does not generate such tell-tale peaks. If the reader finds peaks where none were anticipated, then the image is deemed a fake. Likewise, if the reader finds no peaks where peaks were anticipated, then the image is also deemed a fake. Before performing such analysis, it is preferable to use the embedded digital watermark to re-align the image to its original orientation at the time of printing. Attributes due to the halftone screen can then be evaluated in a proper spatial frame of reference. For example, if the original ordered dither matrix printer created an array of peaks in the Fourier domain, then the peak locations can be checked more accurately after the image is realigned.

Additional Authentication Methods

Another way to authenticate the printed object is to embed separate digital watermarks in the object, including one in the substrate of the object, and another hidden in a visible image printed on the substrate. A verification device looks for these watermarks in a scanned image of the object, and used the expected relationship between them to check authenticity. In one case, the presence of one watermark without the other indicates that the object is a fake. For example, if the image on an authentic object is scanned and re-printed on another substrate of a fake object, then the new substrate will not have the watermark embedded in the substrate.

In one implementation, the substrate carries a digital watermark in the form of the calibration signal as described above. This digital watermark is embedded so as to be substantially imperceptible by modulating the surface micro-topology of the substrate to form the calibration signal, which is a pseudorandom pattern with registration peaks in a transform domain (e.g., autocorrelation or Fourier transform domain). In the detection/verification process, a watermark detector processes a scanned image of the object, looking for the calibration signal. If none is present, or only a weak signal as measured by the extent of correlation with the known calibration signal, then the object is deemed a fake.

One form of substrate watermark is a layer of UV ink or lacquer that modulates the topology of the object surface to form the substrate watermark signal. This UV ink is transparent or semi-transparent, yet forms a surface topology that modulates the luminance of the object surface to embed the watermark signal. This layer of ink can be formed on the surface of the object by printing an image of the substrate watermark onto the object using the UV ink or lacquer.

The other watermark may be embedded in a luminance or other color channel of a color image or gray-scale image printed on the object. For the sake of explanation, let's refer to this other watermark as the image watermark, as opposed to the substrate watermark.

For additional verification, the substrate and image watermarks can carry payload information that must satisfy a predetermined relationship to establish the authenticity of the object bearing these digital watermarks. For example, the message payloads may need to satisfy a predetermined relationship (e.g., one is a cryptographic transform of the other).

Either the substrate or the image watermark may also be embedded at predetermined locations relative to the other watermark or some visible fiducial on the object that can be detected automatically. Such a geometric relationship between the digital watermark and a fiducial, or between different digital watermarks is designed to be difficult to re-produce accurately in a copy of the object. To check authenticity, the watermark location is extracted and checked relative to the location of a second watermark or fiducial. If the relative positions of the watermark and fiducial/second watermark do not fall within a predetermined tolerance, the object is deemed to be a fake. The fiducial may be a simple visible pattern detectable by pattern recognition techniques, the edge of page, the border of text (e.g., margin of the page), or some other distinguishable structure.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of embedding a digital watermark in a digital image, comprising:
   generating an image adapted to be applied to an object based on the digital image, including:
      converting the digital image to at least one halftone image; and
      embedding an auxiliary signal in the digital image so that the auxiliary signal is substantially imperceptible, yet machine readable; and
   encoding a message in the auxiliary signal that includes halftone information, wherein the halftone information is configured to be automatically readable from a printed version of the image to enable checking whether measured attributes of the printed version of the image correspond to the halftone information.

2. The method of claim 1, further comprising spread spectrum modulating a carrier signal with the message to form the auxiliary signal.

3. The method of claim 2, wherein the message comprises information indicating the type of halftone conversion used to create the halftone image.

4. The method of claim 1, wherein the auxiliary signal is embedded in the digital image prior to converting the digital image to a halftone image.

5. A method of authenticating a printed object, comprising:
receiving a digital image scanned of the printed object;
detecting a digital watermark in the digital image;
extracting halftone information from the digital watermark; and
evaluating the digital image for attributes that correspond to the halftone information from the digital watermark to determine authenticity of the printed object.

6. The method of claim 5, further comprising, before evaluating the digital image, aligning the digital image geometrically based on the digital watermark.

7. The method of claim 5, wherein evaluating the digital image comprises evaluating the digital image for attributes corresponding to a halftone screen type identified in the halftone information.

8. The method of claim 5, wherein evaluating the digital image comprises evaluating the digital image for signal peaks corresponding to a halftone type identified in the halftone information.

9. A computer-readable storage device having instructions stored thereon that, if executed by a computing device, cause the computing device to perform operations comprising:
generating an image adapted to be applied to an object based on the digital image, including:
converting the digital image to at least one halftone image; and
embedding an auxiliary signal in the digital image so that the auxiliary signal is substantially imperceptible, yet machine readable; and
encoding a message in the auxiliary signal that includes halftone information, wherein the halftone information is configured to be automatically readable from a printed version of the image to enable checking whether measured attributes of the printed version of the image correspond to the halftone information.

10. A computer-readable storage device having instructions stored thereon that, if executed by a computing device, cause the computing device to perform operations comprising:
receiving a digital image scanned of a printed object;
detecting a digital watermark in the digital image;
extracting halftone information from the digital watermark; and
evaluating the digital image for attributes that correspond to the halftone information from the digital watermark to determine authenticity of the printed object.

11. An apparatus comprising:
a processor configured to:
generate an image adapted to be applied to an object based on the digital image, including:
converting the digital image to at least one halftone image; and
embedding an auxiliary signal in the digital image so that the auxiliary signal is substantially imperceptible, yet machine readable; and
encode a message in the auxiliary signal that includes halftone information, wherein the halftone information is configured to be automatically readable from a printed version of the image to enable checking whether measured attributes of the printed version of the image correspond to the halftone information.

12. An apparatus comprising:
a processor configured to:
receive a digital image scanned of a printed object;
detect a digital watermark in the digital image;
extract halftone information from the digital watermark; and
evaluate the digital image for attributes that correspond to the halftone information from the digital watermark to determine authenticity of the printed object.

* * * * *

UNITED STATES PATENT AND TRADEMARK OFFICE
CERTIFICATE OF CORRECTION

PATENT NO. : 8,006,092 B2
APPLICATION NO. : 11/779061
DATED : August 23, 2011
INVENTOR(S) : Rodriguez et al.

It is certified that error appears in the above-identified patent and that said Letters Patent is hereby corrected as shown below:

Title Page, item (57), under "Abstract", Column 2, Line 10, delete "due a change" and insert -- due to a change --.

Page 3, item (56), under "Other Publications", in Column 2, Line 6, delete "Watermaking," and insert -- Watermarking, --.

Page 3, item (56), under "Other Publications", in Column 2, Line 25, delete "Digimare" and insert -- Digimarc --.

Page 3, item (56), under "Other Publications", in Column 2, Line 32, delete "pp. 3 316-322." and insert -- pp. 316-322. --.

Page 3, item (56), under "Other Publications", in Column 2, Line 63, delete "Carnban" and insert -- Carnahan --.

Page 4, item (56), under "Other Publications", in Column 1, Line 2, delete "2001," and insert -- 2000, --.

Signed and Sealed this
Fourteenth Day of February, 2012

David J. Kappos
*Director of the United States Patent and Trademark Office*